(12) United States Patent
Liew et al.

(10) Patent No.: US 11,941,133 B2
(45) Date of Patent: Mar. 26, 2024

(54) FPGA CHIP WITH PROTECTED JTAG INTERFACE

(71) Applicant: Hewlett Packard Enterprise Development LP, Houston, TX (US)

(72) Inventors: Siung Siew Liew, Singapore (SG); Khai Chiah Chng, Singapore (SG)

(73) Assignee: Hewlett Packard Enterprise Development LP, Spring, TX (US)

( * ) Notice: Subject to any disclaimer, the term of this patent is extended or adjusted under 35 U.S.C. 154(b) by 194 days.

(21) Appl. No.: 17/483,329

(22) Filed: Sep. 23, 2021

(65) Prior Publication Data
US 2023/0090760 A1 Mar. 23, 2023

(51) Int. Cl.
| | |
|---|---|
| G06F 21/62 | (2013.01) |
| G01R 31/317 | (2006.01) |
| G01R 31/3185 | (2006.01) |
| G06F 21/50 | (2013.01) |
| G06F 21/70 | (2013.01) |

(52) U.S. Cl.
CPC ....... *G06F 21/62* (2013.01); *G01R 31/31719* (2013.01); *G01R 31/31855* (2013.01); *G01R 31/318572* (2013.01); *G06F 21/50* (2013.01); *G06F 21/70* (2013.01)

(58) Field of Classification Search
CPC .... G06F 21/50; G06F 21/62; G06F 21/70–79; G01R 31/31719; G01R 31/31855; G01R 31/318572
See application file for complete search history.

(56) References Cited

U.S. PATENT DOCUMENTS

| | | | | |
|---|---|---|---|---|
| 9,810,736 | B2* | 11/2017 | Cottrell | G01R 31/318588 |
| 2010/0217964 | A1* | 8/2010 | Peterka | G01R 31/31719 |
| | | | | 713/185 |
| 2013/0108063 | A1* | 5/2013 | Verhoeve | G01R 31/3187 |
| | | | | 324/750.3 |
| 2015/0242606 | A1* | 8/2015 | Shin | G06F 21/602 |
| | | | | 726/17 |
| 2022/0003817 | A1* | 1/2022 | Khatri | G06F 21/572 |

* cited by examiner

*Primary Examiner* — Madhuri R Herzog
(74) *Attorney, Agent, or Firm* — Park, Vaughan, Fleming & Dowler LLP

(57) ABSTRACT

One aspect provides an FPGA chip mounted on a printed circuit board (PCB). The FPGA chip can include a joint test action group (JTAG) interface comprising a number of input/output pins and an enablement pin, and a control logic block coupled to the enablement pin of the JTAG interface. The control logic block can receive a control signal from an off-chip control unit and control a logical value of the enablement pin based on the received control signal, thereby facilitating the off-chip control unit to lock or unlock the JTAG interface. The FPGA chip can further include a detection logic block to detect an unauthorized access to the FPGA chip. An input to the detection logic is coupled to the enablement pin, and a conductive trace coupling the input of the detection logic block and the enablement pin is situated on an inner layer of the PCB.

18 Claims, 10 Drawing Sheets

| JTAGEN SIGNAL | AFTER AND GATE 208 | ACCESS - PROTECTION | AFTER AND GATE 210 | EXPECTED OUTPUT | DETECTION RESULT |
|---|---|---|---|---|---|
| 0 → 0 | 0 | 0 (UNLOCK) | 0 | 0 | MATCH (NO TOGGLING) |
| 1 → 1 | 0 | 0 | 0 | 0 | MATCH (NO TOGGLING) |
| 0 → 1 | 1 | 0 | 0 | 0 | MATCH (TOGGLING IGNORED) |
| 1 → 0 | 0 | 0 | 0 | 0 | MATCH (TOGGLING IGNORED) |
| 0 → 0 | 0 | 1 (LOCK) | 0 | 0 | MATCH (NO TOGGLING) |
| 1 → 1 | 0 | 1 | 0 | 0 | MATCH (NO TOGGLING) |
| 0 → 1 | 1 | 1 | 1 | 0 | MISMATCH (TOGGLING TRIGGERS ALARM) |
| 1 → 0 | 0 | 1 | 0 | 0 | MATCH (TOGGLING IGNORED) |

| TCK SIGNAL | RISING-EDGE REGISTER | FALLING-EDGE REGISTER | ACCESS-PROTECTION | AFTER AND GATE 310 |
|---|---|---|---|---|
| 0 → 0 | 0 | 0 | 1 (LOCK) | 0 |
| 1 → 1 | 0 | 0 | 1 | 0 |
| 0 → 1 | 1 | 0 | 1 | 0 |
|  | 1 | 1 (PREVIOUSLY SET) | 1 | 1 (PULSE DETECTED) |
| 1 → 0 | 0 | 1 | 1 | 1 |
|  | 1 (PREVIOUSLY SET) | 1 | 1 | 1 (PULSE DETECTED) |

| ALARM_ACCESS_KEY | VOID | TIMEOUT | ACCESS_PROTECTION | ACCESS_KEY_VALID | JTAGEN |
|---|---|---|---|---|---|
| X (DON'TCARE) | X (DON'TCARE) | X (DON'TCARE) | 0 | X (DON'TCARE) | 1(UNLOCK) |
| 0 (CORRECT KEY) | 0 | 0 | 1 | 1 | 1(UNLOCK) |
| 0 (CORRECT KEY) | 1 | 1 | 1 | 0 | 0(LOCK) |
| 1 (WRONG KEY) | 1 | X (DON'TCARE) | 1 | 0 | 0(LOCK) |

440

FIG. 4B

FPGA CHIP WITH PROTECTED JTAG INTERFACE

BACKGROUND

This disclosure is generally related to a field-programmable gate array (FPGA) chip. More specifically, this disclosure is related to a system and method that protects the test and control interface of the FPGA chip to prevent unauthorized access to the FPGA chip.

BRIEF DESCRIPTION OF THE FIGURES

FIG. 3B illustrates the truth table of JTAG-signal-detection logic 300, according to one aspect of the application.

FIG. 4B illustrates the truth table of control logic 400, according to one aspect of the application.

In the figures, like reference numerals refer to the same figure elements.

DETAILED DESCRIPTION

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

Network switching equipment (e.g., switches and routers) often use FPGA devices as system controllers for various functions, such as power management, inter-chip and peripheral communication, etc. During the development and the manufacture testing phases, the digital design logics inside an FPGA chip can be tested using the joint test action group (JTAG) technique. More specifically, the FPGA chip can be equipped with a JTAG interface (which can have two, four, or five pins, depending on the JTAG version). In order to prevent unauthorized access to the FPGA (e.g., tempering with the FPGA flash memory), the JTAG interface should be protected. In current practice, the JTAG header is physically removed from the printed circuit board (PCB), upon which the FPGA is mounted, thus preventing anyone from gaining access to the FPGA. However, this can create maintenance problems for regular users. A user will have to ship a defective unit back to the manufacturer instead of having on-site access to perform testing and debugging. Without next level protection implemented on top of the JTAG, the entire system can be vulnerable and may be abused by hackers.

This disclosure provides a solution to the problem of protecting the JTAG interface without physically removing the JTAG header from the PCB. According to one aspect, the to-be-protected FPGA chip can be programmed to include a control logic block and a detection logic block. The control logic block can output a control signal via an I/O pin on the FPGA. Such an I/O pin can be electrically coupled to the enablement pin (i.e., JTAGEN) of the JTAG interface. In other words, the output of the control logic block can enable or disable the JTAG interface. The control logic block can receive an input from devices external to the FPGA, such as the switch central processing unit (CPU), thus allowing a control software running on the CPU to enable/disable the JTAG interface. The detection logic block can monitor activities on the JTAG pins, including JTAGEN and the clock pin (i.e., TCK). Abnormal activities (e.g., unexpected enablement signals or clock signals) can trigger the detection logic block to send alarm signals to the control logic block. Upon receiving the alarm signals, the control logic block can disable the JTAG interface, thus preventing unauthorized access to the FPGA.

Figure 1:
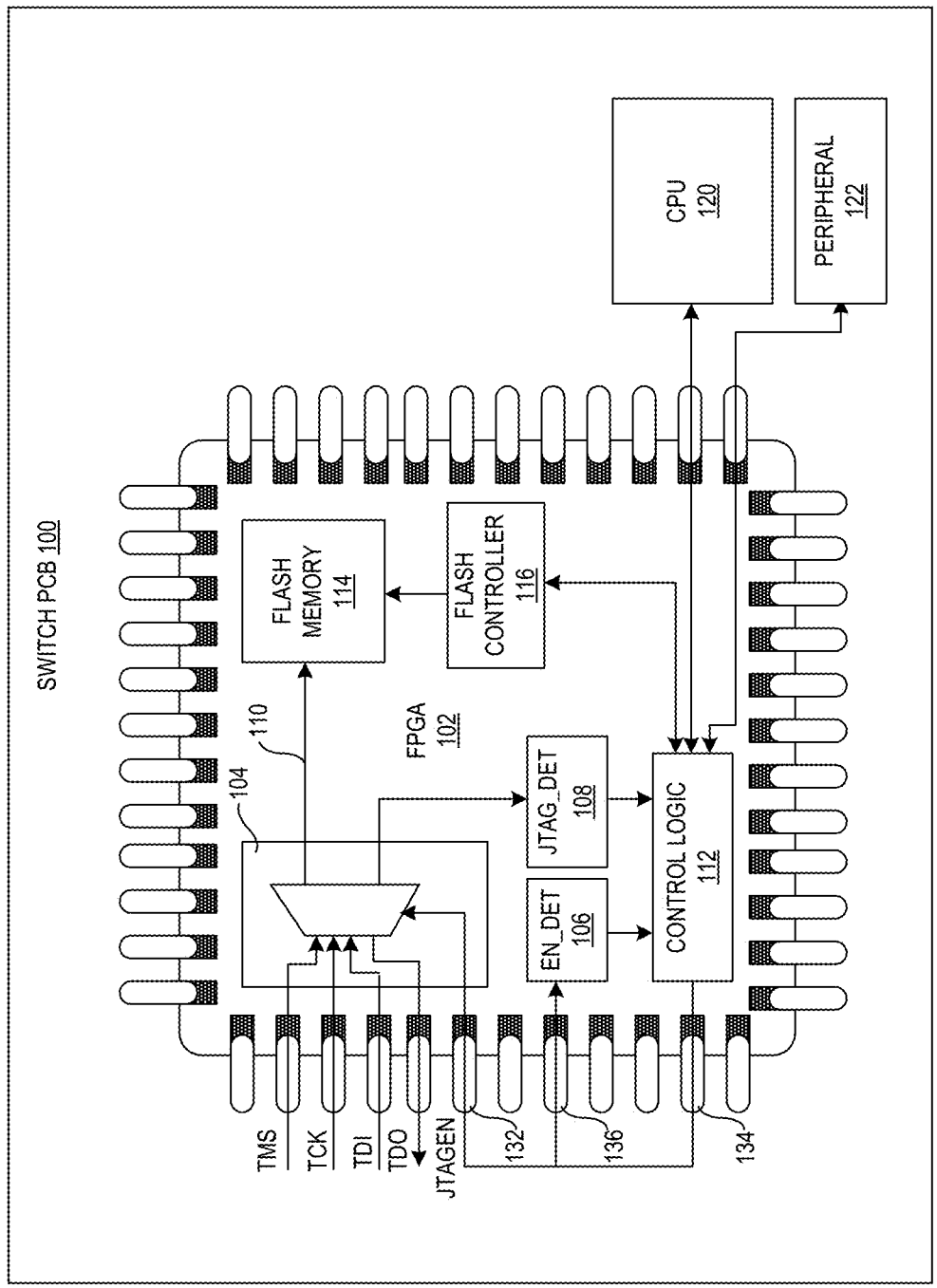
FIG. 1 illustrates a system architecture for implementing joint test action group (JTAG) protection, according to one aspect of the application.

FIG. 1 illustrates a system architecture for implementing JTAG protection, according to one aspect of the application. More specifically, FIG. 1 shows a partial view of a switch PCB 100. Switch PCB 100 can include an FPGA chip 102, a switch CPU 120, and peripheral devices 122. Other switch components, such as the switch ports, are not shown in FIG. 1.

FPGA chip 102 can be used as a controller for the switch and can be used to control peripheral devices 122, such as a power source. FPGA chip 102 can include various function blocks, including a JTAG interface 104, an enablement-signal-detection (EN_DET) logic block 106, a JTAG-signal-detection (JTAG_DET) logic block 108, a control logic block 112, a flash memory 114, and a flash controller 116.

JTAG interface 104 can be a standard FPGA feature to allow a developer to program and debug FPGA chip 102. In the example shown in FIG. 1, JTAG interface 104 can be coupled to five connector pins of FPGA chip 102 to facilitate input/output of JTAG signals, including the test mode select (TMS) signal, the test clock (TCK) signal, the test data in (TDI) signal, the test data out (TDO) signal, and the JTAG enablement (JTAGEN) signal. More specifically, the logical value of JTAGEN pin 132 can lock/unlock JTAG interface 104 and place the other four JTAG pins (i.e., TMS, TCK, TDI, and TDO) in two different (dedicated or shared) modes. In one example, when JTAGEN is high (or a logical "1"), JTAG interface 104 is unlocked, and the JTAG pins are placed in a dedicated mode. With JTAG interface 104 unlocked, access to flash memory 114 (e.g., via signal trace 110) is granted and device programming or other JTAG-related functions are available. When JTAGEN is low (or a logical "0"), JTAG interface 104 is locked, and the JTAG pins are placed in a shared mode, allowing them to be used as general purpose I/O (GPIO) pins. With JTAG interface 104 locked, access to flash memory 114 is blocked.

FIG. 1 shows that JTAGEN pin 132 can be electrically coupled (e.g., via a conductive trace on PCB 100) to another I/O pin 134 of FPGA chip 102. Hence, JTAG interface 104 can be enabled or disabled by setting the voltage or logical value of I/O pin 134. According to one aspect, I/O pin 134 can be coupled to control logic block 112, which interacts with switch CPU 120. This allows control software running in switch CPU 120 to send a signal to control logic block 112, causing control logic block 112 to output a control signal on I/O pin 134. In other words, the control software running in CPU 120 can enable or disable JTAG interface 104 via control logic block 112, thus providing board-level protection to JTAG interface 104.

In addition to enabling/disabling JTAG interface 104, control logic block 112 can also send control signals to flash controller 116 and peripheral devices 122. For example, when an intrusion is detected, control logic block 112 can send a power-off signal to peripheral devices 122, or control logic block 112 can send an erase-memory signal to flash controller 116, instructing flash controller 116 to erase contents of flash memory 114.

FIG. 1 also shows that, in addition to interacting with switch CPU 120, control logic block 112 can also receive inputs from detection logics, including enablement-signal-detection logic block 106 and JTAG-signal-detection logic block 108. These detection logic blocks can be configured to perform chip-level detections to detect intrusions to the system in the event of failure of the board-level protection provided by the control logic. More specifically, enablement-signal-detection logic block 106 can monitor voltage levels on JTAGEN pin 132 to detect unexpected JTAGEN signals. This can be done by electrically coupling JTAGEN pin 132 to an FPGA I/O pin 136 (e.g., via a conductive trace on switch PCB 100), which is then coupled to enablement-signal-detection logic block 106. This way, signal variations on JTAGEN pin 132 can be sent to enablement-signal-detection logic block 106 via I/O pin 136. When an unexpected change on JTAGEN pin 132 is detected, indicating an unauthorized attempt to unlock JTAG interface 104, enablement-signal-detection logic block 106 can send an alarm signal to control logic block 112. JTAG-signal-detection logic block 108 can monitor the JTAG signal lines (e.g., the TCK signal line). Any abnormality in the JTAG signal lines can cause JTAG-signal-detection logic block 108 to send an alarm signal to control logic 112. In one example, JTAG-signal-detection logic block 108 can monitor the TCK line. More particularly, JTAG-signal-detection logic block 108 can be configured to detect rising and falling edges on the TCK signal line. Upon detecting unexpected rising and falling edges, JTAG-signal-detection logic block 108 can send out an alarm signal to control logic 112. Direct monitoring of the JTAG signal lines can be useful in the event of a hacker jamming the JTAGEN signal (e.g., forcing it to be "1") and taking control of the JTAG signal lines.

Figures 2A, 2B:
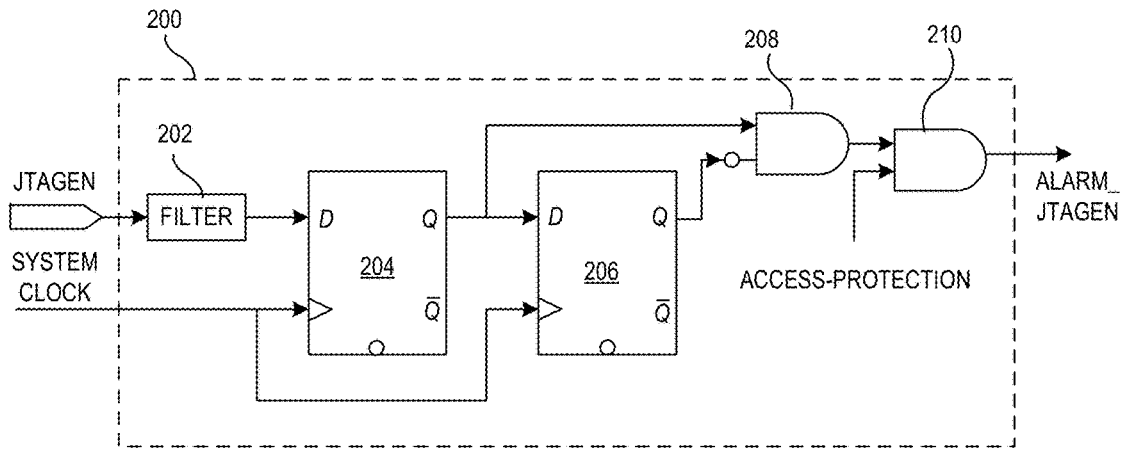
FIG. 2A illustrates a block diagram of an enablement-signal-detection logic, according to one aspect of the application.
FIG. 2B illustrates the truth table of enablement-signal-detection logic 200, according to one aspect of the application.

FIG. 2A illustrates a block diagram of an enablement-signal-detection logic, according to one aspect of the application. In FIG. 2A, enablement-signal-detection logic 200 can include a filter 202, flip-flops 204 and 206, and AND gates 208 and 210. The input to enablement-signal-detection logic 200 can be the monitored JTAGEN signal, and the clock signal can be the FPGA clock.

Filter 202 can be responsible for filtering out metastable noise. Flip-flops 204 and 206 are arranged such that there is a delay of a clock cycle between the output of flip-flop 204 and the output of flip-flop 206. The output of the flip-flop 204 and the inversed output of flip-flop 206 are then sent to AND gate 208. If the JTAGEN signal is toggled from a logical "0" to a logical "1" during a clock cycle, AND gate 208 outputs a logical "1;" otherwise, AND gate 208 outputs a logical "0." Note that a transition from a logical "0" to a logical "1" means that the JTAGEN transitions from the "locked" state to the "unlocked" state. Unless expected, such a transition can indicate intrusion. AND gate 210 allows an access-protection bit to override the detection of "0" to "1" transition. When the access-protection bit is set as "0," meaning that JTAG-access protection is not activated, AND gate 210 will always output a "0," regardless of whether a "0" to "1" transition is detected on the JTAGEN signal. On the other hand, when the access-protection bit is set as "1," meaning that JTAG-access protection is activated, AND gate 210 will output a "1," in response to a "0" to "1" transition being detected on the JTAGEN signal. The logical "1" output of AND gate 210 generates an alarm signal to be sent to the control logic.

FIG. 2B illustrates the truth table of enablement-signal-detection logic 200, according to one aspect of the application. The first column of table 220 shows the possible transitions of the JTAGEN signal; the second column shows the output of AND gate 208; the third column shows the value of the access-protection bit (with "0" and "1" indicating, respectively, the unlocked and locked state of the JTAG interface); and the fourth column shows the output of AND gate 210, which is also the output of enablement-signal-detection logic 200. Table 200 also includes a fifth column showing the expected output of enablement-signal-detection logic 200 and a sixth column showing the detection result. Note that the expected output of enablement-signal-detection logic 200 should always be "0," assuming the JTAG interface is unlocked or there is no intrusion. However, when an intrusion is detected on the locked JTAG interface, as indicated by row 222, there is a mismatch between the expected output and the actual output. Consequently, an alarm signal is generated and sent to the control logic. In one example, the logical "1" output of AND gate 210 sets an alarm bit in a register array in the control logic.

Figure 3A:
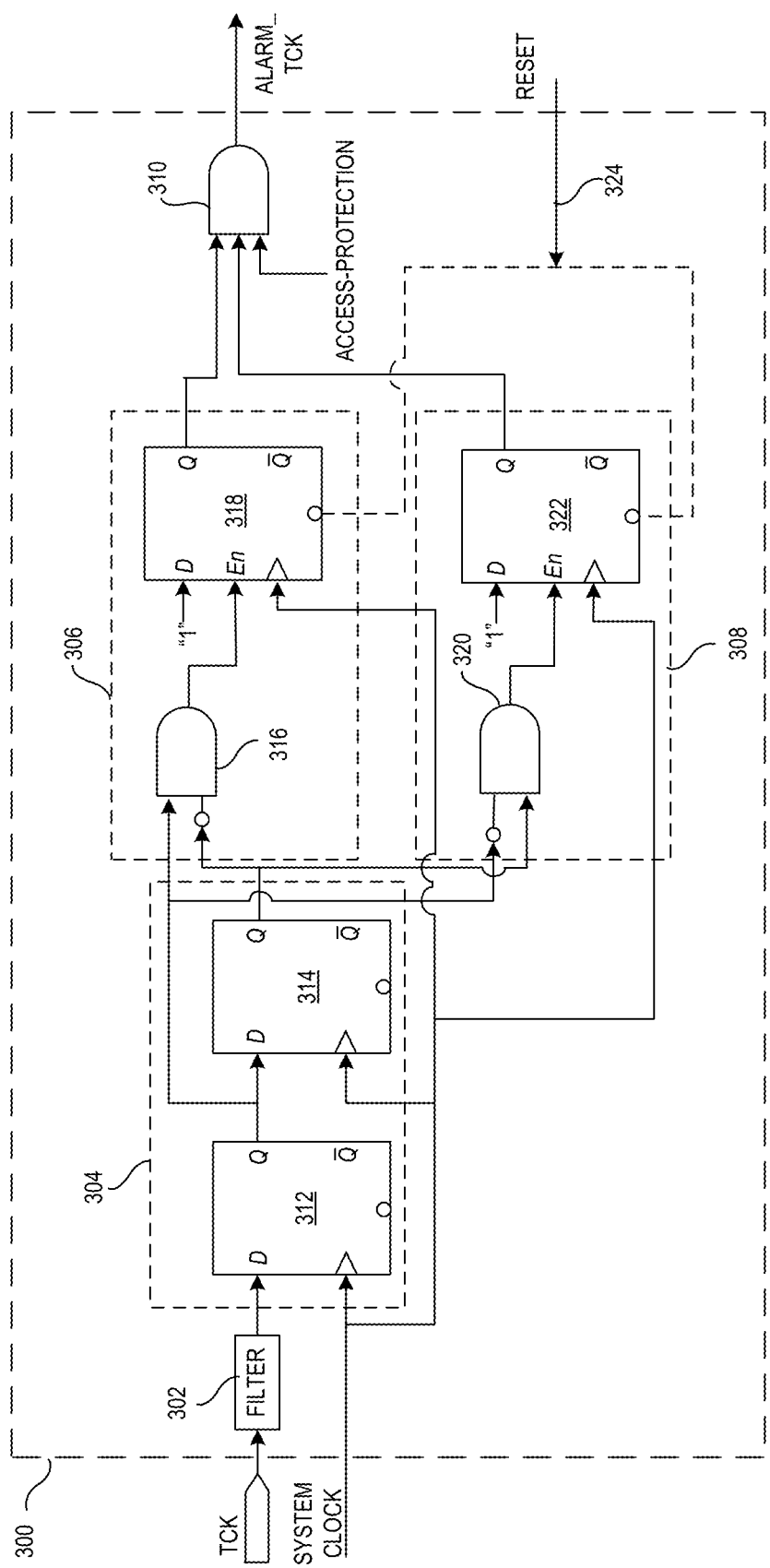
FIG. 3A illustrates a block diagram of the JTAG-signal-detection logic, according to one aspect of the application.

FIG. 3A illustrates a block diagram of the JTAG-signal-detection logic, according to one aspect of the application. In this example, the input to JTAG-signal-detection logic 300 can be the monitored TCK signal, and the clock signal can be the FPGA clock. In FIG. 3A, JTAG-signal-detection logic 300 can include a filter 302, a delay logic 304, a rising-edge detection logic 306, a falling-edge detection 308, and an AND gate 310.

Filter 302 can be responsible for removing metastable noise or glitches. Delay logic 304 can include flip-flops 312 and 314, which are similar to flip-flops 204 and 206 and can sample the TCK signals at the rate of the FPGA clock. Note that the FPGA clock is typically much faster than the TCK, making it possible to accurately sample any change of the TCK signal.

Rising-edge detection logic 306 can include an AND gate 316 and a rising-edge register 318. AND gate 316 and rising-edge register 318 are configured such that whenever there is a rising edge (i.e., a "0" to "1" transition) on the TCK signal, rising-edge register 318 is set to store a bit value "1." For example, a "0" to "1" transition can trigger the enablement of register 318. Falling-edge detection logic 308 can include an AND gate 320 and a falling-edge register 322. AND gate 320 and falling-edge register 322 are configured such that whenever there is a falling edge (i.e., a "1" to "0" transition) on the TCK signal, falling-edge register 322 is set to store a bit value "1." For example, a "1" to "0" transition can trigger the enablement of register 322.

AND gate 310 has three inputs, including the bit value of riding-edge register 320, the bit value of falling-edge register 326, and the bit value of the access-protection bit. As discussed previously, when the access-protection bit is set as "0," the JTAG interface is in an unprotected mode, and AND gate 310 will always output a "0" regardless of the values of the registers. In such a situation, no alarm will be generated. When the access-protection bit is set as "1," the JTAG interface is in a protected mode, and AND gate 310 can output a bit "1" when both registers store a bit "1." In other words, when both a rising edge and a falling edge are detected on the TCK signal, an alarm will be generated.

FIG. 3A also shows an optional reset input 324 that can be used to reset registers 318 and 322. After an alarm has been generated, to detect subsequent intrusions, a reset signal can be generated and sent to registers 318 and 322.

FIG. 3B illustrates the truth table of JTAG-signal-detection logic 300, according to one aspect of the application. The first column of table 340 shows the possible transitions of the TCK signal; and the second column shows the bit value of the rising-edge register (i.e., register 318). Table 340 shows that the rising-edge register stores a bit "1" when a "0" to "1" transition of the TCK signal is detected. The third column of table 340 shows the bit value of the falling-edge register (i.e., register 322); the fourth column shows the value of the access-protection bit; and the fifth column shows the output of AND gate 310. Table 340 shows that the falling-edge register stores a bit "1" when a "1" to "0" transition of the TCK signal is detected. As shown in rows 342 and 344, when both registers store a bit "1" and the access-protection bit is set as "1," the output of AND gate 310 is set as "1," indicating a pulse has been detected on the TCK signal.

Note that under normal circumstances, when the JTAG interface is locked or protected, no activity should be observed on the JTAG signal lines. Hence, a pulse on the TCK signal line is likely to be the result of someone injecting a clock signal into the JTAG interface and attempting to access the FPGA memory via the JTAG interface. For simplicity of illustration, the situation where the access-protection bit is set as "0" is not shown in FIG. 3B. As discussed previously, when the access-protection bit is set as "0," no alarm will be generated regardless of the values of the rising-edge and falling-edge registers. Note that the default value of the access-protection bit is a logical "1" in the official FPGA image to ensure that the JTAG interface is always in the "locked" state after the offline programming in the manufacturing environment.

Figure 4A:
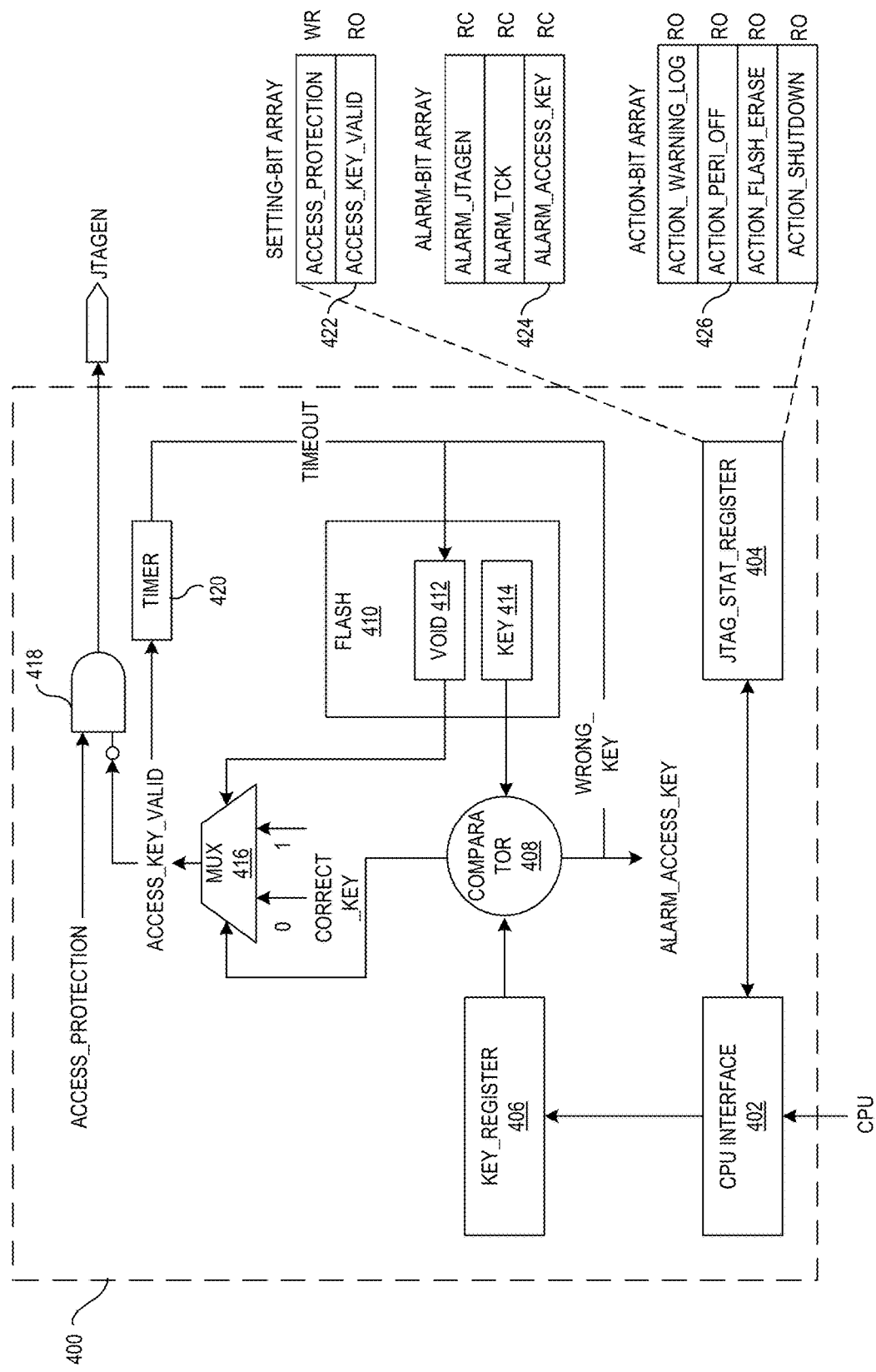
FIG. 4A illustrates a block diagram of the control logic, according to one aspect of the application.

FIG. 4A illustrates a block diagram of the control logic, according to one aspect of the application. Control logic 400 can include a CPU interface 402, a JTAG-status register array 404, a user-key register 406, a comparator 408, and a flash memory 410 that stores a VOID bit 412 and an access key 414. Control logic 400 can further include a multiplexer 416, a negated AND (NAND) gate 418, and a timer 420.

Control software running in the switch CPU or the CPU of a control node can interact with control logic 400 via control CPU interface 402. In this example, CPU interface 402 can include a wishbone arbiter that allows the CPU to write into or read from JTAG status register array 404 and to write into user-key register 406. JTAG status register array 404 stores status information, including the locked/unlocked state, the alarms, the actions to be taken in the event of the intrusion, etc. Detailed descriptions of JTAG status register array 404 will come later. When a user attempts to unlock the JTAG interface, the control software can write, via CPU interface 402, an access key into user-key register 406.

Flash memory 410 stores a void bit 412 and vendor-generated access key 414. More particularly, void bit 412 and access key 414 are stored in flash memory 410 when the FPGA is programmed offline in the manufacturing line. Void bit 412 always has an initial logical value of "0," and it can only be flipped from "0" to "1." Comparator 408 compares the access key written into user-key register 406 and access key 414 stored in flash memory 410. If they are not the same, the wrong key is written into user-key register 406, meaning that a break-in attempt has occurred. According to one aspect, upon determining that the wrong key is written into user-key register 406, comparator 408 can generate an alarm (e.g., by setting an alarm_access_key bit in JTAG status register array 404). The output of comparator 408 can also be used to determine the output of multiplexer 416. According to one aspect, when the keys match (or when the access key written into user-key register 406 is the correct key), multiplexer 416 outputs a logical value "0;" otherwise, multiplexer 416 outputs a logical value "1." The output of multiplexer 416 can be inversed and sent to NAND gate 418 along with the access-protection bit. The output of NAND 418 is the output of control logic 400 and can be coupled, via an external conductive trace, to the JTAGEN pin. In other words, when the access-protection bit is "1" and the output of multiplexer 416 is "0" (indicating a matched key), a logical value "1" is sent to the JTAGEN pin, unlocking the JTAG interface. This way, software running in the CPU can dynamically unlock the JTAG interface (e.g., by writing an access key into user-key register 406). On the other hand, if the output of multiplexer 416 is "1" (indicating a wrong key is used), a logical value "0" is sent to the JTAGEN pin, and the JTAG interface will remain locked.

In addition to the access key, void bit 412 can provide another level of protection. More particularly, when a wrong key is detected, void bit 412 can be flipped from its default value "0" to "1." Void bit 412 can be configured to select the output of multiplexer 416 such that, when void bit is "1," multiplexer 416 can only output a logical value "1," which can, in turn, locks the JTAG interface.

Moreover, when the JTAG interface is unlocked (e.g., by entering the correct access key), a countdown timer 420 can be started. The initial value of the countdown timer can be determined based on the maximum amount of time that the JTAG interface is allowed to remain unlocked. This value can be configurable depending on the application. In one example, the JTAG interface can be allowed to remain unlocked for a few minutes to allow its operator to perform various testing or debugging operations. When timer 420 expires, void bit 412 is flipped from "0" to "1," thus preventing access to the JTAG interface. Note that, because void bit 412 can only be flipped from "0" to "1," once it is flipped, the JTAG interface is locked throughout the power cycle. Resetting the void bit to unlock the JTAG interface can be done by reconfiguring the FPGA (e.g., through software).

FIG. 4B illustrates the truth table of control logic 400, according to one aspect of the application. The first column of table 440 is the bit value of the alarm-access-key register. As shown in FIG. 4A, this bit is set as "1" when a wrong access key is detected. The second column of table 440 is the value of void bit 412, and the third column indicates whether timer 420 times out. Table 440 shows that, when timer 420 times out, void bit 412 is set as "1." The fourth column of table 440 shows the value of the access-protection bit, the fifth column indicates whether the access key is valid, and the last column is the output of the control logic (i.e., the JTAGEN signal). When the access-protection bit is "0," the JTAG interface is unprotected, with the JTAGEN signal being "1" and all other bits being "don't care." The default value of the access-protection bit is "1." Table 440 also shows that, when in the protected mode (i.e., the access-protection bit is set as "1"), the JTAG interface can only be unlocked when a correct access key is entered (i.e., the alarm-access-key bit is "0" and the access-key-valid bit is "1"), as shown by row 442 of table 440.

Returning to FIG. 4A, JTAG-status register array 404 can include a number of registers, including a setting-bit array 422, an alarm-bit array 424, and an action-bit array 426. Setting-bit array 422 can include a write-and-read (WR) register storing an access-protection bit and a read-only register storing an access-key-valid bit. As discussed previously, when the access-protection bit is set as "0," the JTAG interface is unlocked or unprotected; and when the access-protection bit is set as "1," the JTAG interface is locked or protected. The default value of the access-protection bit is set as "1." The access-key-valid bit is set based on the output of multiplexer 416. When a correct key is entered and void bit 412 is "0," the access-key-valid bit is set as "1;" and when a wrong key is entered or void bit 412 is "1," the access-key-valid bit is set as "0."

Alarm-bit array 424 stores the various alarm bits generated by the detection logics, such as the enablement-signal detection logic and the JTAG-signal-detection logic. As discussed previously, when the detection logics detect an intrusion, either on the enablement pin or on the JTAG signal lines, the detection logics can generate an alarm by setting a corresponding alarm bit in alarm-bit array 424. Alarm-bit array 424 can include three read-and-clear registers, including an alarm-JTAGEN register, an alarm-TCK register, and an alarm-access-key register, each register storing an alarm bit. The bit stored in the alarm-JTAGEN register can be set by the enablement-signal-detection logic in response to detecting an unexpected toggling of the JTAGEN signal. The bit stored in the alarm-TCK register can be set by the JTAG-signal-detection logic in response to detecting unexpected pulses on the TCK signal line. The bit stored in the alarm-access-key register can be set by control logic 400. More specifically, when comparator 408 determines that the access key written into user-key register 406 does not match access key 414 stored in flash memory 410, the bit stored in alarm-access-key register is set as "1," indicating a wrong access key is detected.

Action-bit array 426 includes a number of read-only registers, each storing an action bit indicating whether a corresponding action should be carried out in the event of an intrusion. According to one aspect, action-bit array 426 can include an action-warning-log register, an action-peripheral-off register, an action-flash-erase register, and an action-shutdown register. Depending on the system security level, the FPGA can be configured such that a certain action will be carried out when an intrusion is detected. The action can be typically carried out by control logic 400. For example, if the system security level is low, the bit stored in the action-warning-log register can be set as "1," meaning that control logic 400 will report the intrusion event to the CPU. When the CPU reads the action register, it will log the event and notify the user (e.g., via the control software). If the system security level is medium, the bit stored in the action-peripheral-off register can be set as "1," meaning that control logic 400 can send control signals to the peripheral devices to turn off these devices. If the system security level is high, the bit stored in the action-flash-erase register and/or the action-shutdown register can be set as "1," meaning that control logic 400 can send control signals to the flash memory to erase the contents of the flash memory and/or power down the FPGA. Note that, although brutal, the last two actions (i.e., the erase-memory action and the FPGA-power-down action) can be the last defense in preventing leakage of critical information during an intrusion.

The control logic allows the user to dynamically lock/unlock the JTAG interface. For example, if debugging is needed, the user can unlock the JTAG interface using control software running on the CPU (e.g., by entering a command comprising an access key). In response to the user command, the CPU sends the access key to the control logic, which compares the user-entered access key with the access key stored in the FPGA flash memory. If the key is a correct key, the control logic can output a JTAGEN signal onto the JTAGEN pin (e.g., output a logical "0"), thus unlocking the JTAG interface. A countdown timer is also triggered to allow a limited amount of access time to the JTAG interface. In addition, the control software can also read the various alarm registers to determine if an intrusion is detected (e.g., if a hacker takes control of the JTAGEN signal or the JTAG signal lines). In response to an alarm bit being set in one of the alarm registers, the control software can send a command to the control logic, instructing the control logic to output a JTAGEN signal to lock the JTAG interface. For example, in response to detecting an alarm bit being set, the control software can send a signal to the control logic to flip the void bit, thus effectively locking the JTAG interface. In response to detecting the alarm(s), the control software can also read the action registers to determine what kind of action (e.g., a reporting action, a peripheral-off action, an erase-memory action, or an FPGA-power-down action) to be taken.

In addition to including the functional blocks (e.g., the control logic block and the various detection logic blocks) inside the FPGA chip, the PCB also should be designed in such a way as to provide further security enhancements. For example, although the JTAG interface can be locked by software through the JTAGEN pin, the system can still be compromised when the intruder has physical access to the PCB upon which the FPGA chip is mounted. By including security features in the PCB, one can protect the system even when the intruder has physical access to the PCB. According to one aspect, the PCB can be designed to prevent an intruder tampering with the detection logics. For example, one can route the connection between the enablement-signal-detection logic and the JTAGEN pin in an inner layer of the PCB or short the two pins (e.g., pins 132 and 136 in FIG. 1) directly. This way, the intruder is not aware of the monitoring of the JTAGEN signal. When the intruder tries to unlock the JTAG interface by setting the logical value of the JTAGEN pin to "1," the enablement-signal-detection logic can detect such unauthorized change and generate an alarm to cause the control logic to send out a control signal to lock the JTAG interface (e.g., by flipping the void bit).

Figure 5:
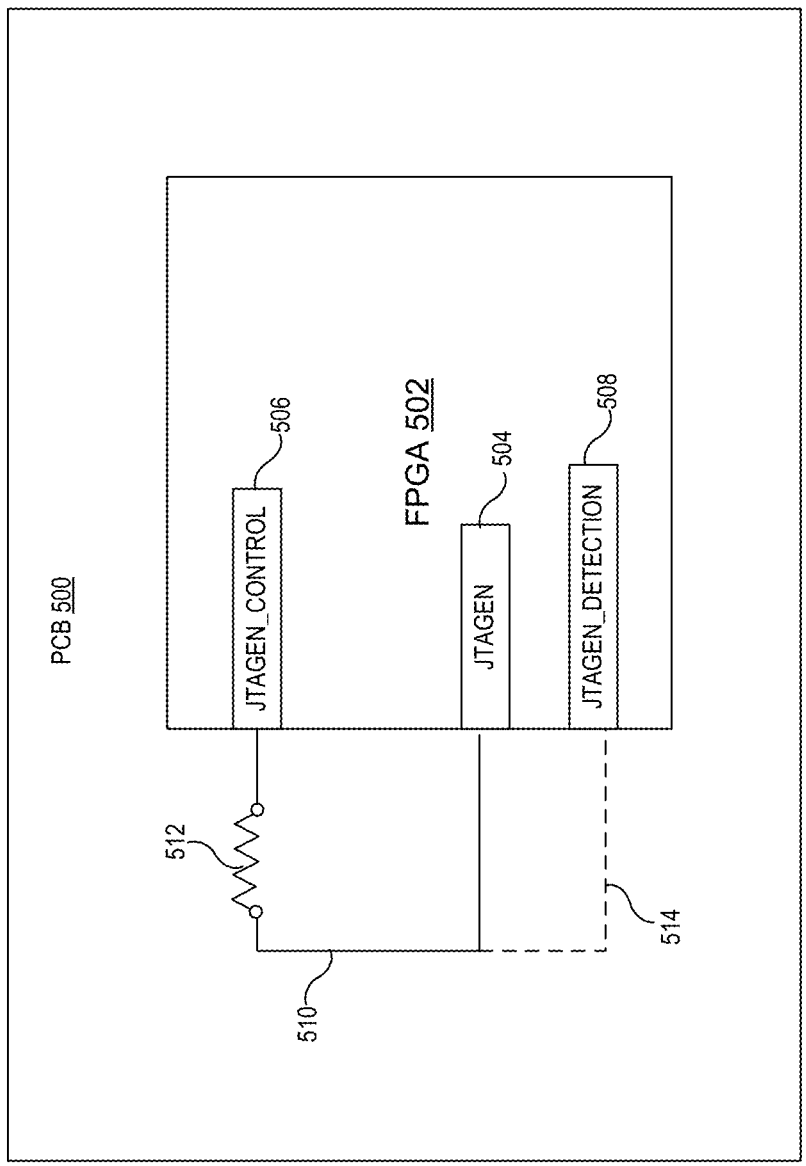
FIG. 5 illustrates a schematic of the PCB traces, according to one aspect of the application.

FIG. 5 illustrates a schematic of the PCB traces, according to one aspect of the application. PCB 500 can include an FPGA 502 that includes a number of I/O pins to connect to various internal functional blocks. In FIG. 5, FPGA 502 can include a JTAGEN pin 504, a JTAGEN-control pin 506, and a JTAGEN-detection pin 508. JTAGEN pin 504 can be similar to JTAGEN pin 132 shown in FIG. 1 and is coupled to the JTAG interface; JTAGEN-control pin 506 can be similar to I/O pin 134 shown in FIG. 1 and is coupled to the control logic; and JTAGEN-detection pin 508 can be similar to I/O pin 136 shown in FIG. 1 and is coupled to the enablement-signal-detection logic. For simplicity of illustration, the JTAG interface, the control logic, and the enablement-signal-detection logic are not shown in FIG. 5.

FIG. 5 shows a conductive trace 510 external to FPGA 502 coupling JTAGEN pin 504 and JTAGEN-control pin 506. More particularly, conductive trace 510 can be on the top layer of PCB 500 and can include a detachable resistor 512. In one example, detachable resistor 512 can be a 0-Ohm resistor. During the development phase of FPGA 502, detachable resistor 512 can be removed, resulting in conductive trace 510 being open. In such a situation, the internal control logic no longer controls the JTAGEN signal. When the product is ready to be shipped to the customer, detachable resistor 512 can be soldered on, allowing the internal control logic to gain control of the JTAGEN signal.

FIG. 5 also shows a conductive trace 514 external to FPGA 502 coupling JTAGEN pin 504 and JTAGEN-detection pin 508. More particularly, conductive trace 514 is shown using a dashed line to indicate that this trace is in the inner layer of PCB 500, such that it is "hidden" from an intruder. As discussed previously, this can prevent the intruder from tampering with this signal path to prevent the detection of the intrusion.

Figure 6:
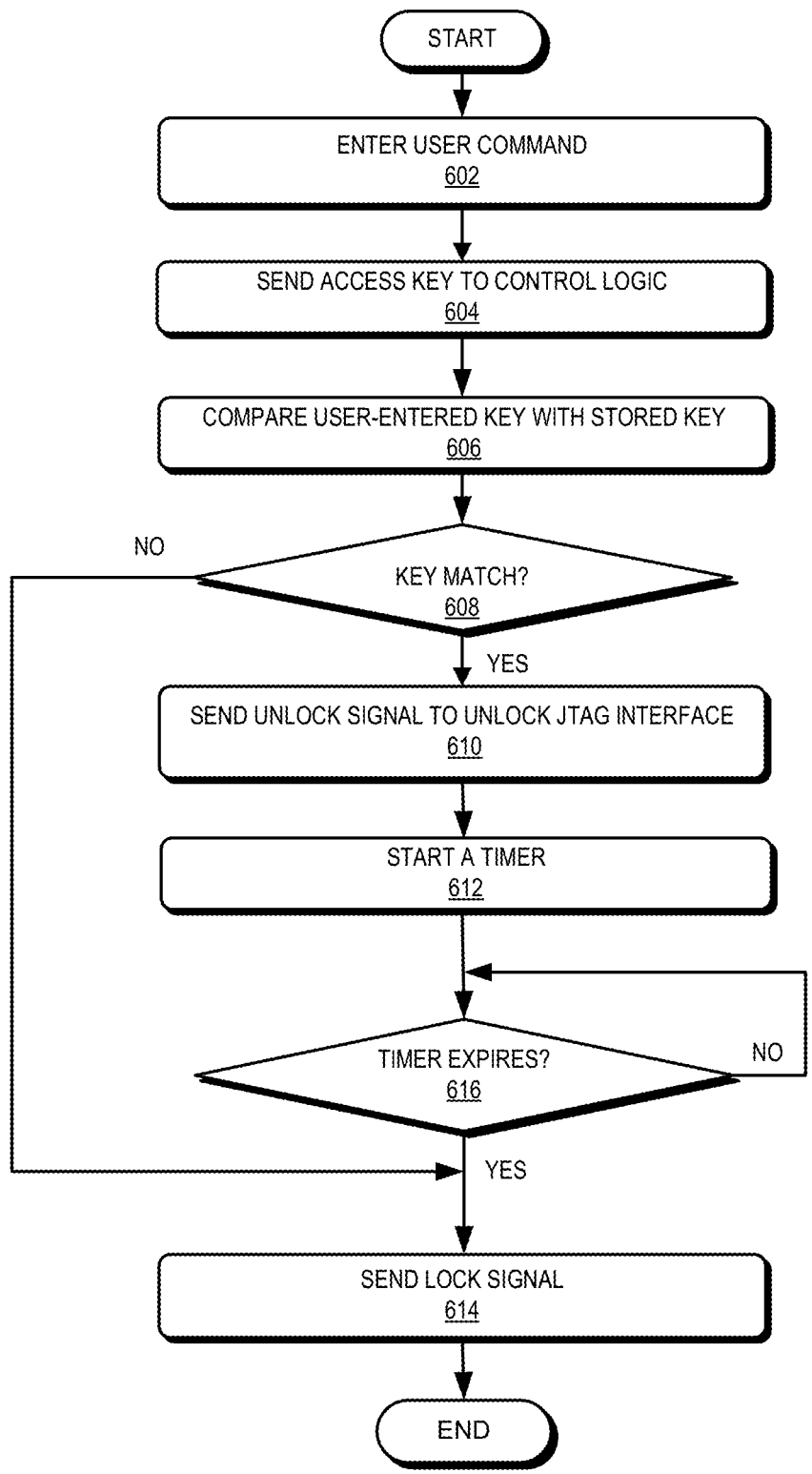
FIG. 6 provides a flowchart illustrating a process for unlocking the JTAG interface of an FPGA, according to one aspect of the application.

FIG. 6 provides a flowchart illustrating a process for unlocking the JTAG interface of an FPGA, according to one aspect of the application. In this example, the FPGA is part of a switch and can be used as a controller for various functions of the switch. The official FPGA image has the access-protection bit set to its default value "1" and the access-key-valid bit set to its default value "0." This way, when the FPGA is configured using the official image, it is always in the locked state.

At the customer site, during runtime, a user can enter a command in a user interface of a control application controlling the FPGA (operation 602). The control application can be running in the switch CPU or it can be running in a separate computer that communicates with the switch CPU. According to one aspect, entering the user command can include entering an access key. The access key can be sent to the control logic in the FPGA (operation 604). The control logic can compare the user-entered key with the access key stored in the FPGA memory (e.g., a flash memory) (operation 606) and determine whether the user-entered key matches the stored key (operation 608).

If the user-entered key matches the stored key, the control logic sends an unlock signal to the JTAG interface (e.g., by sending a logical "1" to the JTAGEN pin) to unlock the JTAG interface (operation 610) and starts a timer (operation 612). If the user-entered key does not match the stored key, the control logic sends a lock signal to the JTAG interface (e.g., by sending a logical "0" to the JTAGEN pin), resulting in the JTAG interface remaining locked (operation 614). The control logic also monitors the timer (operation 616), and once the timer expires, the control logic sends a lock signal to the JTAG interface (e.g., by sending a logical "0" to the JTAGEN pin) to lock the previously unlocked JTAG interface (operation 614).

Figure 7:
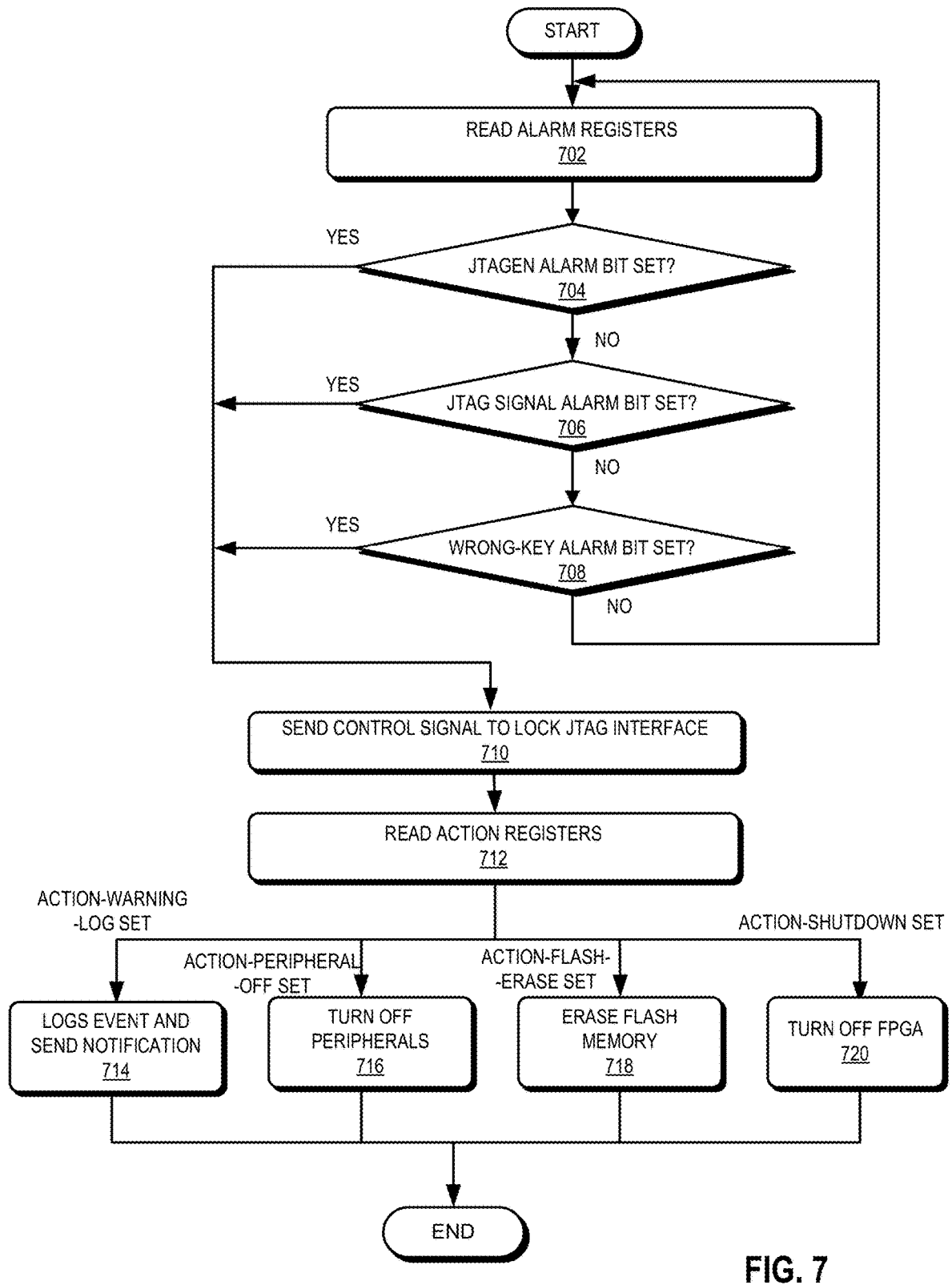
FIG. 7 provides a flowchart illustrating a process for detecting an intrusion to the JTAG interface, according to one aspect of the application.

FIG. 7 provides a flowchart illustrating a process for detecting an intrusion to the JTAG interface, according to one aspect of the application. During operation, a control application controlling the FPGA can read, via the CPU interface on the FPGA, the values of a number of alarm registers (operation 702). The control application can be running in the switch CPU or it can be running in a separate computer that communicates with the switch CPU. According to one aspect, the control application can be running in the background. The control application can determine whether the JTAGEN alarm bit is set (i.e., whether an intrusion occurs on the JTAGEN signal line) (operation 704). An unexpected transition from "1" to "0" on the JTAGEN signal line typically means an intrusion is occurring. If the JTAGEN alarm bit is not set, the control application can determine whether the alarm bit corresponding to a JTAG signal line (e.g., the TCK line) is set (operation 706). An unexpected pulse detected on the TCK line or a different JTAG signal line can also indicate an intrusion. If the JTAG signal alarm bit is not set, the control application can determine whether the wrong-key alarm bit is set (operation 708). This can result from a user entering the wrong access key. If no alarm bit is set, the control application continues to read the alarm registers (operation 702).

If any of the alarm bits is set, the control application can send a signal to the FPGA control logic, which in response sends a control signal to lock the JTAG interface (operation 710). The control application further reads the action registers (operation 712). If the action-warning-log register is set, the control application logs the detected intrusion event (e.g., recording the type of alarm, the time, etc.) and sends a notification to the user (operation 714). If the action-peripheral-off register is set, the control application sends a control signal to the FPGA control logic, which in turn sends out control signals to turn off the peripheral devices (operation 716). If the action-flash-erase register is set, the control application can send a control signal to the FPGA control logic, instructing the control logic to erase the contents of the flash memory inside the FPGA (operation 718). If the action-shutdown register is set, the control application can send a control signal to the FPGA control logic, instructing the control logic to power off the FPGA (operation 720). Note that one or more action bits can be set, meaning that one or more actions can be performed in response to an alarm bit being set and read by the control application. For example, in response to detecting an alarm bit being set, the control application can log the event and instruct the control logic to turn off the peripherals. Alternatively, in response to detecting an alarm bit being set, the control application can log the event and instruct the control logic to erase the flash memory.

Figure 8:
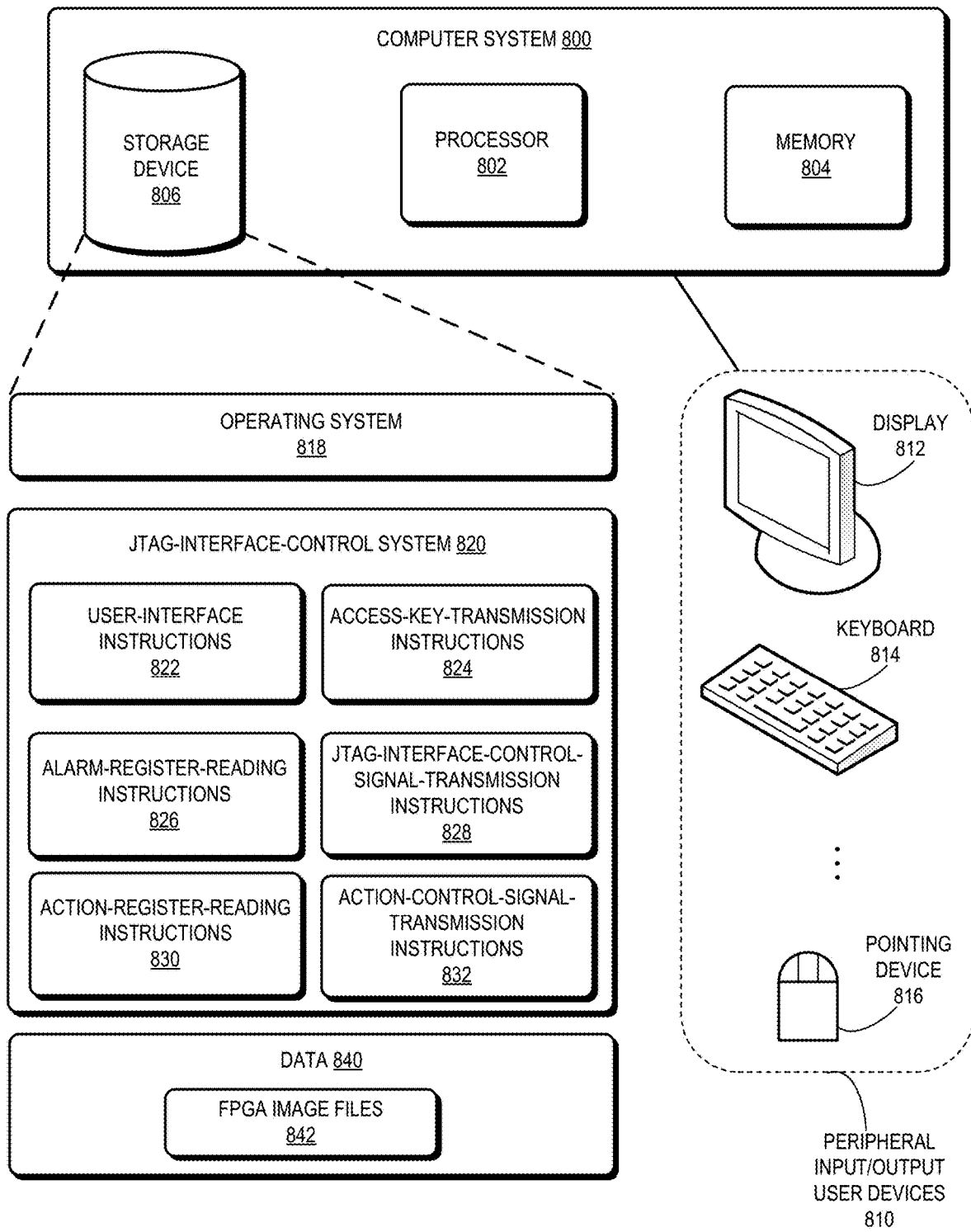
FIG. 8 illustrates a computer system that facilitates runtime control of the JTAG interface of an FPGA device, according to one aspect of the application.

FIG. 8 illustrates a computer system that facilitates runtime control of the JTAG interface of an FPGA device, according to one aspect of the application. Computer system 800 includes a processor 802, a memory 804, and a storage device 806. Furthermore, computer system 800 can be coupled to peripheral input/output (I/O) user devices 810, e.g., a display device 812, a keyboard 814, and a pointing device 816. Storage device 806 can store an operating system 818, a JTAG-interface-control system 820, and data 840. According to one aspect, computer system 800 can be part of the network switch.

JTAG-interface-control system 820 can include instructions, which when executed by computer system 800, can cause computer system 800 or processor 802 to perform methods and/or processes described in this disclosure. Specifically, JTAG-interface-control system 820 can include instructions for providing a user interface to allow a user to enter a command (user-interface instructions 822), instructions for transmitting a user-entered access key to the FPGA (access-key-transmission instructions 824), instructions for reading the alarm registers (alarm-register-reading instructions 826), instructions for transmitting control signals to lock and unlock the JTAG interface (JTAG-interface-control-signal-transmission instructions 828), instructions for reading the action registers (action-register-reading instructions 830), and instructions for transmitting control signals to perform various actions in response to detecting an intrusion (action-control-signal-transmission instructions 832). Data 840 can include FPGA image files 842.

In general, this disclosure provides a system and method for dynamic control of the JTAG interface of a programmable logic device (PLD) during runtime. In this disclosure, an FPGA chip with a JTAG interface is used in the various examples. The same solution can be used in other devices that use JTAG interface for developing, testing, and debugging purposes. More specifically, the PLD can be configured to include an internal control logic block and at least one internal detection logic block. The output of the control logic block can be coupled, via an external conductive trace, to the enablement pin of the JTAG interface, thus allowing an external control unit (e.g., a CPU communicating with the PLD) to enable/disable the JTAG interface via the control logic block. According to one aspect, to enable or unlock the JTAG interface, a user needs to enter an access key via the external control unit. The access key can be compared with a key stored inside the PLD. A matching key can cause the control logic to send an unlock signal to the JTAGEN pin to unlock/enable the JTAG interface, whereas a mismatched key can cause the control logic to generate an alarm. In addition to controlling the enablement of the JTAG interface, the internal detection logic block can detect unauthorized access to the FPGA via the JTAG interface. The internal detection logic block can include a sub-block for detecting unexpected transitions of the JTAGEN signal and a sub-block for detecting unexpected pulses on the JTAG signal lines. Once an intrusion is detected, alarms can be generated, and the control logic can be configured to lock the JTAG interface and perform various pre-determined actions. Those actions are pre-configured when the PLD was configured. Depending on the security level requirements of the PLD, the actions can range from simply logging and reporting the intrusion to erasing the internal memory and/or turning off the PLD. The disclosed solution can be implemented at reduced cost with minor changes to the hardware, firmware, and software. This solution can protect the JTAG interface from unauthorized access during runtime and greatly increase the security robustness of the system (e.g., a network switching platform) that uses the PLD as a system controller.

One aspect of the instant application provides a field-programmable gate array (FPGA) chip mounted on a printed circuit board (PCB). The FPGA chip can include a joint test action group (JTAG) interface comprising a number of input/output (I/O) pins and an enablement pin, and a control logic block coupled to the enablement pin of the JTAG interface. The control logic block can receive a control signal from an off-chip control unit and control a logical value of the enablement pin based on the received control signal, thereby facilitating the off-chip control unit to lock or unlock the JTAG interface. The FPGA chip can further include a detection logic block to detect an unauthorized access to the FPGA chip. An input to the detection logic is coupled to the enablement pin, and a conductive trace coupling the input of the detection logic block and the enablement pin is situated on an inner layer of the PCB.

In a variation on this aspect, the FPGA chip can further include a second detection logic block. An input of the second detection logic block is coupled to at least one I/O pin of the JTAG interface, thereby facilitating detection of an abnormal signal on the at least one I/O pin.

In a further variation, the at least one I/O pin can include a test clock (TCK) pin, and the second detection logic block can be configured to generate an alarm signal in response to detecting an unexpected pulse on the TCK pin.

In a variation on this aspect, the detection logic block can be configured to generate an alarm signal in response to detecting an unexpected transition on the enablement pin.

In a variation on this aspect, the off-chip control unit can be a central processing unit (CPU), and the control signal can include an access key.

In a further variation, the control logic block can further include a comparator configured to compare the access key included in the control signal with an access key stored in a memory within the FPGA chip and logic gate configured to: in response to the comparator determining that the access key included in the control signal matches the access key stored in the memory, output an unlock signal to the enablement pin to unlock the JTAG interface; and in response to the comparator determining that the access key included in the control signal does not match the access key stored in the memory, output a lock signal to the enablement pin to lock the JTAG interface.

In a further variation, the control logic can further include a timer. The timer can be started in response to the comparator determining that the access key included in the control signal matches the access key stored in the memory, and the logic gate can be configured to output a lock signal to the enablement pin to lock the JTAG interface in response to expiration of the timer.

In a variation on this aspect, an output of the control logic block and the enablement pin can be coupled via a conductive trace situated on a top layer of the PCB, and the conductive trace can include a detachable resistor to allow the control logic block to decouple from the FPGA chip during development of the FPGA chip.

In a variation on this aspect, the control logic block can be configured to perform one or more actions in response to the detection logic block detecting an unauthorized access to the FPGA chip.

In a variation on this aspect, the one or more actions can include: logging and reporting the unauthorized access, sending a control signal to turn off one or more peripheral devices coupled to the FPGA chip, erasing an internal memory of the FPGA chip, and powering off the FPGA chip.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A field-programmable gate array (FPGA) chip mounted on a printed circuit board (PCB), comprising:
   a joint test action group (JTAG) interface comprising a number of input/output (I/O) pins and an enablement pin;
   a control logic block coupled to the enablement pin of the JTAG interface, wherein the control logic block is to receive a control signal from an off-chip control unit and control a logical value of the enablement pin based on the received control signal, thereby facilitating the off-chip control unit to lock or unlock the JTAG interface; and
   a detection logic block to detect an unauthorized access to the FPGA chip, wherein an input to the detection logic is coupled to the enablement pin, and wherein a conductive trace coupling the input of the detection logic block and the enablement pin is situated on an inner layer of the PCB;
   wherein an output of the control logic block and the enablement pin is coupled via a conductive trace situated on a top layer of the PCB, and wherein the conductive trace comprises a detachable resistor to allow the control logic block to decouple from the FPGA chip during development of the FPGA chip.

2. The FPGA chip of claim 1, further comprising a second detection logic block, wherein an input of the second detection logic block is coupled to at least one I/O pin of the JTAG interface, thereby facilitating detection of an abnormal signal on the at least one I/O pin.

3. The FPGA chip of claim 2, wherein the at least one I/O pin comprises a test clock (TCK) pin, and wherein the second detection logic block is configured to generate an alarm signal in response to detecting an unexpected pulse on the TCK pin.

4. The FPGA chip of claim 1, wherein the detection logic block is configured to generate an alarm signal in response to detecting an unexpected transition on the enablement pin.

5. The FPGA chip of claim 1, wherein the off-chip control unit is a central processing unit (CPU), and wherein the control signal includes an access key.

6. The FPGA chip of claim 5, wherein the control logic block further comprises:
   a comparator configured to compare the access key included in the control signal with an access key stored in a memory within the FPGA chip; and
   a logic gate configured to:
      in response to the comparator determining that the access key included in the control signal matches the access key stored in the memory, output an unlock signal to the enablement pin to unlock the JTAG interface; and
      in response to the comparator determining that the access key included in the control signal does not match the access key stored in the memory, output a lock signal to the enablement pin to lock the JTAG interface.

7. The FPGA chip of claim 6, wherein the control logic further comprises a timer, wherein the timer is started in response to the comparator determining that the access key included in the control signal matches the access key stored in the memory, and wherein the logic gate is configured to output a lock signal to the enablement pin to lock the JTAG interface in response to expiration of the timer.

8. The FPGA chip of claim 1, wherein the control logic block is configured to perform one or more actions in response to the detection logic block detecting an unauthorized access to the FPGA chip.

9. The FPGA chip of claim 8, wherein the one or more actions comprise:
   logging and reporting the unauthorized access;
   sending a control signal to turn off one or more peripheral devices coupled to the FPGA chip;
   erasing an internal memory of the FPGA chip; and
   powering off the FPGA chip.

10. A method to protect a field-programmable gate array (FPGA) chip mounted on a printed circuit board (PCB), comprising:
    configuring the FPGA chip to include a control logic block and a detection logic block;
    coupling an output of the control logic block to an enablement pin of a joint test action group (JTAG) interface of the FPGA chip to allow the control logic block to receive a control signal from an off-chip control unit and control a logical value of the enablement pin based on the received control signal, thereby facilitating the off-chip control unit to lock or unlock the JTAG interface; and
    coupling an input of the detection logic block to the enablement pin to detect an unauthorized access to the FPGA chip, wherein a conductive trace coupling the input of the detection logic block and the enablement pin is situated on an inner layer of the PCB;
    wherein an output of the control logic block and the enablement pin is coupled via a conductive trace situated on a top layer of the PCB, wherein the conductive trace comprises a detachable resistor, and wherein the method further comprises detaching the resistor during development of the FPGA chip to decouple the control logic block from the FPGA chip.

11. The method of claim 10, further comprising:
    configuring a second detection logic block; and
    coupling an input of the second detection logic block to at least one I/O pin of the JTAG interface, thereby facilitating detection of an abnormal signal on the at least one I/O pin.

12. The method of claim 11, wherein the at least one I/O pin comprises a test clock (TCK) pin, and wherein the method further comprises generating an alarm signal in response to the second detection logic detecting an unexpected pulse on the TCK pin.

13. The method of claim 10, further comprising generating an alarm signal in response to the detection logic block detecting an unexpected transition on the enablement pin.

14. The method of claim 10, wherein the off-chip control unit is a central processing unit (CPU), and wherein receiving the control signal includes receiving an access key.

15. The method of claim 14, further comprising:
    comparing the access key included in the control signal with an access key stored in a memory within the FPGA chip,
    in response to determining that the access key included in the control signal matches the access key stored in the memory, sending an unlock signal to the enablement pin to unlock the JTAG interface; and
    in response to determining that the access key included in the control signal does not match the access key stored in the memory, generating an alarm signal.

16. The method of claim 15, further comprising:
in response to determining that the access key included in the control signal matches the access key stored in the memory, starting a timer; and
in response to expiration of the timer, sending a lock signal to the enablement pin to lock the JTAG interface.

17. The method of claim 10, further comprising performing one or more actions in response to the detection logic block detecting an unauthorized access to the FPGA chip.

18. The method of claim 17, wherein the one or more actions comprise:
logging and reporting the unauthorized access;
sending a control signal to turn off one or more peripheral devices coupled to the FPGA chip;
erasing an internal memory of the FPGA chip; and
powering off the FPGA chip.

* * * * *